US012576406B2

(12) United States Patent
Sauser et al.

(10) Patent No.: US 12,576,406 B2
(45) Date of Patent: Mar. 17, 2026

(54) JAW CRUSHER SYSTEMS, METHODS, AND APPARATUS

(71) Applicant: Superior Industries, Inc., Morris, MN (US)

(72) Inventors: Ed Sauser, Morris, MN (US); Grant Holmes, Morris, MN (US)

(73) Assignee: Superior Industries, Inc., Morris, MN (US)

(*) Notice: Subject to any disclaimer, the term of this patent is extended or adjusted under 35 U.S.C. 154(b) by 270 days.

(21) Appl. No.: 18/329,373

(22) Filed: Jun. 5, 2023

(65) Prior Publication Data

US 2023/0390782 A1 Dec. 7, 2023

Related U.S. Application Data

(60) Provisional application No. 63/365,806, filed on Jun. 3, 2022.

(51) Int. Cl.
*B02C 1/02* (2006.01)
*B02C 1/04* (2006.01)
*B02C 1/10* (2006.01)

(52) U.S. Cl.
CPC ................ *B02C 1/025* (2013.01); *B02C 1/04* (2013.01)

(58) Field of Classification Search
CPC ........... B02C 1/025; B02C 1/04; B02C 1/043; B02C 1/10
See application file for complete search history.

(56) References Cited

U.S. PATENT DOCUMENTS

| | | | | |
|---|---|---|---|---|
| 581,756 A | | 5/1897 | Morris et al. | |
| 2,204,024 A | | 6/1940 | Meinhardt | |
| 2,264,915 A | | 12/1941 | Meister | |
| 2,591,639 A | | 4/1952 | Traylor | |
| 3,075,712 A | * | 1/1963 | Kautz | B02C 1/043 241/218 |
| 3,804,345 A | | 4/1974 | Dediemar | |
| 3,860,183 A | * | 1/1975 | Bogie | B02C 1/04 241/267 |
| 4,899,942 A | | 2/1990 | Boehringer | |

(Continued)

FOREIGN PATENT DOCUMENTS

| | | |
|---|---|---|
| EP | 2810718 A1 | 12/2014 |
| WO | 2008046127 A1 | 4/2008 |

(Continued)

OTHER PUBLICATIONS

L D Michaud, "Dodge Crusher", [retrieved on Sep. 5, 2023]dated Feb. 23, 2016, retrieved from URL <https://www.911metallurgist.com/blog/dodge-crusher>, 8 pages.

(Continued)

*Primary Examiner* — Mohammed S. Alawadi
(74) *Attorney, Agent, or Firm* — Todd R. Fronek; Larkin Hoffman Daly & Lindgren, Ltd.

(57) ABSTRACT

Systems, methods and apparatus are provided for crushing rock. In some embodiments a toggle feature of a jaw crusher is in tension during operation. In some embodiments a lower portion of the moveable jaw moves simultaneously moves closer to the stationary jaw and forward along said first direction. In some embodiments, a direction along which material moves between the moveable and stationary jaws is closer to horizontal than vertical.

6 Claims, 8 Drawing Sheets

(56) References Cited

U.S. PATENT DOCUMENTS

| | | | | |
|---|---|---|---|---|
| 4,927,089 | A | 5/1990 | Altmayer et al. | |
| 6,126,101 | A | 10/2000 | Ostergaard | |
| 6,155,507 | A | 12/2000 | Ostergaard | |
| 6,375,105 | B1 | 4/2002 | Haven et al. | |
| 6,402,072 | B1 | 6/2002 | Lehtonen et al. | |
| 6,641,068 | B2 | 11/2003 | Ostergaard | |
| 7,168,644 | B2 | 1/2007 | Togashi et al. | |
| 7,344,097 | B2 | 3/2008 | Young et al. | |
| 7,510,134 | B2 | 3/2009 | Young et al. | |
| 7,513,446 | B2 | 4/2009 | Young et al. | |
| 8,256,698 | B2 | 9/2012 | Holmes | |
| 8,757,530 | B2 | 6/2014 | Sutti et al. | |
| 8,777,145 | B2 | 7/2014 | Sutti et al. | |
| D719,195 | S | 12/2014 | Ljunggren et al. | |
| 8,925,171 | B2 | 1/2015 | Eriksson et al. | |
| 9,283,564 | B2 | 3/2016 | Sutti et al. | |
| 9,327,289 | B2 | 5/2016 | Sutti | |
| 9,339,820 | B2 | 5/2016 | Lindberg et al. | |
| 9,421,547 | B2 | 8/2016 | Boast et al. | |
| 9,662,655 | B2 | 5/2017 | Iafrate | |
| 2004/0094644 | A1 * | 5/2004 | Douglas | B02C 1/025 241/268 |
| 2004/0129814 | A1 * | 7/2004 | Ha | B02C 1/005 241/267 |
| 2005/0082403 | A1 | 4/2005 | Boast | |
| 2009/0289168 | A1 | 11/2009 | Lindberg et al. | |
| 2013/0009276 | A1 | 1/2013 | Rudeck et al. | |
| 2013/0032012 | A1 | 2/2013 | Baumann et al. | |
| 2014/0191067 | A1 | 7/2014 | Sutti | |
| 2015/0048189 | A1 | 2/2015 | Lindberg et al. | |
| 2015/0102150 | A1 | 4/2015 | Lindberg et al. | |
| 2015/0352555 | A1 | 12/2015 | Svensson et al. | |
| 2016/0121338 | A1 | 5/2016 | Jonkka | |
| 2016/0288127 | A1 | 10/2016 | Milo | |
| 2017/0274383 | A1 | 9/2017 | Rust et al. | |
| 2018/0007174 | A1 | 1/2018 | Bohn et al. | |
| 2018/0216310 | A1 * | 8/2018 | Azzolin | E02F 3/965 |

FOREIGN PATENT DOCUMENTS

| | | | |
|---|---|---|---|
| WO | 2008055315 | A1 | 4/2008 |
| WO | 2016206744 | A1 | 5/2008 |

OTHER PUBLICATIONS

Crushing & Mining Equipment, "CME 1100 HD: Jaw Crusher", Brochure, Jul. 10, 2014, 2 pages.

Eagle Crusher Company, Inc., "Eagle & Eagle Austin-Western Jaw Crushers", Brochure, Galion, Ohio; 2015, 3 pages.

FLSmidth AIS, "TST Jaw Crusher", Brochure, Midvale, Utah; 2013, 8 pages.

Metso Corporation, "Jaw Crusher Nordberg C130", Brochure, Tampere, Finland; 2016, 3 pages.

Terex Minerals Processing Systems, "JW Series World Jaw", Brochure, Jun. 2010, 16 pages.

Weir Minerals, "Trio Jaw Crushers CT and CTHT Series," Brocure, 2016, 16 pages.

* cited by examiner

JAW CRUSHER SYSTEMS, METHODS, AND APPARATUS

BACKGROUND

Aggregate is crushed by various types of crushers including jaw crushers.

DESCRIPTION

Figure 1:
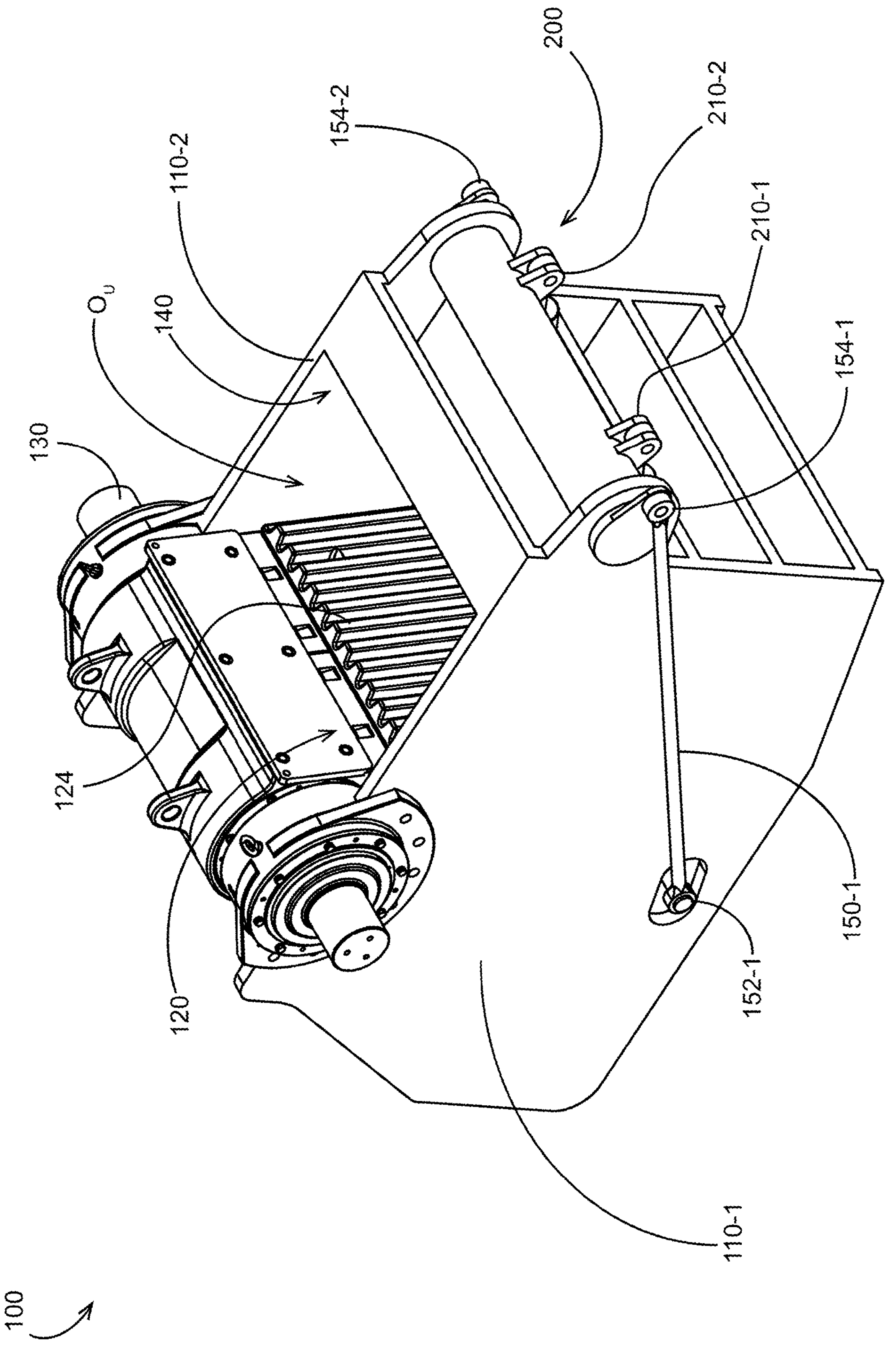
FIG. 1 is a perspective view of an embodiment of a jaw crusher.

Referring to the drawings, wherein like reference numerals designate identical or corresponding parts throughout the several views, FIGS. 1-4 illustrate an embodiment of a jaw crusher 100. The jaw crusher 100 optionally comprises a moveable jaw 120 operably supported on an eccentric shaft 130. The moveable jaw 120 optionally comprises a removable jaw die 122 (e.g., optionally made of a wear-resistant material such as manganese and optionally having a corrugated surface facing the stationary jaw). The jaw crusher 100 optionally comprises a stationary jaw 140. The stationary jaw 140 optionally comprises a removable jaw die 144 (e.g., optionally made of a wear-resistant material such as manganese and optionally having a corrugated surface facing the moveable jaw). The stationary jaw 140 is optionally supported on spaced-apart sidewalls 110-1, 110-2. The eccentric shaft 130 is optionally rotatably supported on sidewalls 110-1, 110-2.

The sidewalls 110-1, 110-2 optionally cooperate with the moveable and stationary jaws 120, 140 to form both an upper opening $O_U$ configured and disposed to receive aggregate material (e.g., rock, stone, gravel, sand, debris, etc.) and a lower opening $O_L$ configured and disposed to release at least partially crushed aggregate material from the jaw crusher 100. The size of a gap G at the lower opening $O_L$ optionally determines the size of material released from the lower opening; as the size of gap G varies during operation, a given size (e.g., minimum size) of gap G may be referred to in the art as the close-side setting. It should be appreciated that movement of the moveable jaw 120 about eccentric shaft (which is optionally driven by a motor such as an electric motor, not shown, which may drive the shaft via a flywheel, drive belt and/or other apparatus) includes movement toward and away from the stationary jaw 140 so as to crush material trapped between the moveable and stationary jaws.

In some embodiments, a link 150-1 is optionally pivotally coupled (e.g., at a first end thereof) to the moveable jaw 120. The link 150-1 is optionally pivotally coupled to the moveable jaw 120 via a crossbar 160 mounted to the moveable jaw 120 defining a pivot point 152-1. The link 150-1 is optionally pivotally coupled (e.g., at a second end thereof) to a support 255-1 (e.g., pin, bearing, shaft, etc.) defining a pivot point 154-1. Support 255-1 is optionally disposed on the opposite side of stationary jaw 140 relative to moveable jaw 120. Support 255-1 is optionally disposed outside of the space between sidewalls 110-1, 110-2. In some embodiments, supports 255 are optionally supported (e.g., welded, mounted with fasteners, etc.) with a breaking strength selected such that in the event the support 255 is broken to allow release of the movable jaw upon introduction of uncrushable material.

In some embodiments, a link 150-2 is optionally pivotally coupled (e.g., at a first end thereof) to the moveable jaw 120. The link 150-2 is optionally pivotally coupled to the moveable jaw 120 via crossbar 160 defining a pivot point 152-2. The link 150-2 is optionally pivotally coupled (e.g., at a second end thereof) to a support 255-2 defining a pivot point 154-2. Support 255-2 is optionally disposed on the opposite side of stationary jaw 140 relative to moveable jaw 120. Support 255-2 is optionally disposed outside of the space between sidewalls 110-1, 110-2.

Links 150-1, 150-2 are optionally or substantially equal length. Links 150-1, 150-2 are optionally disposed outside of the sidewalls 110-1, 110-2. Crossbar 160 optionally extends through openings 112-1, 112-2 in the sidewalls 110-1, 110-2, respectively. Openings 112-1, 112-2 optionally are optionally configured to permit motion of the crossbar 160 as the moveable jaw 120 moves during operation.

It should be appreciated that for a given length of links 150-1, 150-2, the position of pivot point 154-1 (which is optionally coaxial with pivot point 154-2) determines the minimum gap G (e.g., close-side setting) during operation.

Figure 5:
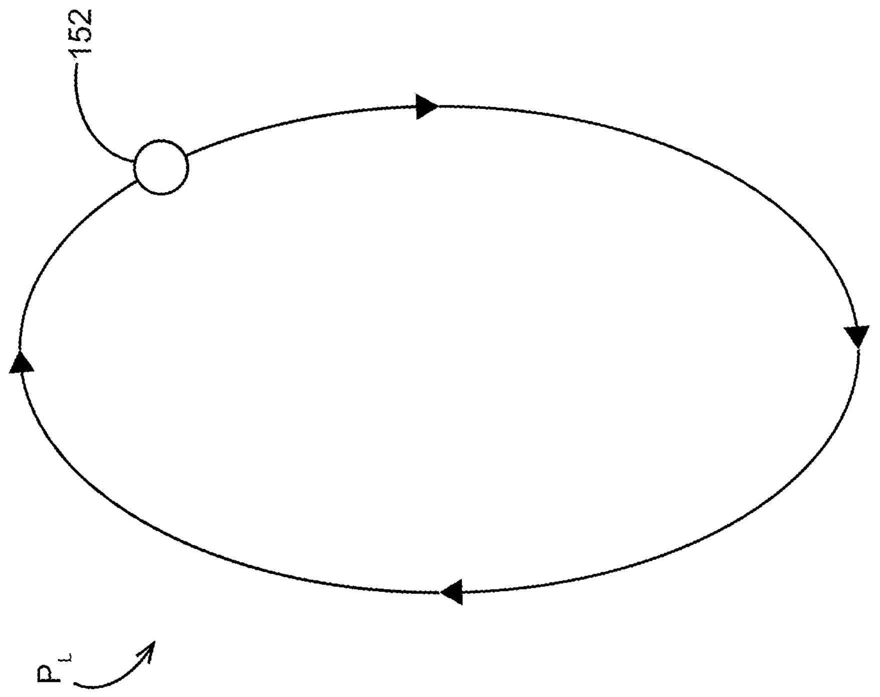
FIG. 5 schematically illustrates a path of a pivot point of the jaw crusher of FIG. 1.

Referring to FIG. 5, during operation the pivot point 152-1 (which is optionally coaxial with pivot point 154-2) moves through a path $P_L$. It should be appreciated that pivot point 152-2 (and thus the lower portion of jaw die 132) moves downward as it moves toward the fixed jaw (e.g., moves downward through at least part of the inward or "crushing" portion of the path). It should be appreciated that the direction of rotation of eccentric shaft 130 is reversed (and/or alternately reversible) to reverse the direction of the path $P_L$.

It should be appreciated that crushing of material between the moveable and stationary jaws will place the links 150-1, 150-2 in tension. In the event that an uncrushable object (e.g., "tramp" material such as metal or excessively tough aggregate material) enters the jaw crusher 100, the links 150-1 and/or 150-2 optionally break to release the moveable jaw (e.g., such that more catastrophic damage to the jaw crusher 100 is avoided). A toughness and/or cross-sectional dimension of the links 150-1 and/or 150-2 are optionally selected in order to maintain integrity of the links 150 during normal crushing operations but to allow the links 150 to break upon introduction of uncrushable material. In some embodiments, the links 150 are extendable (e.g., incorporates a tension spring and/or hydraulic cylinder) to allow the links to extend upon introduction of uncrushable material.

Figure 2:
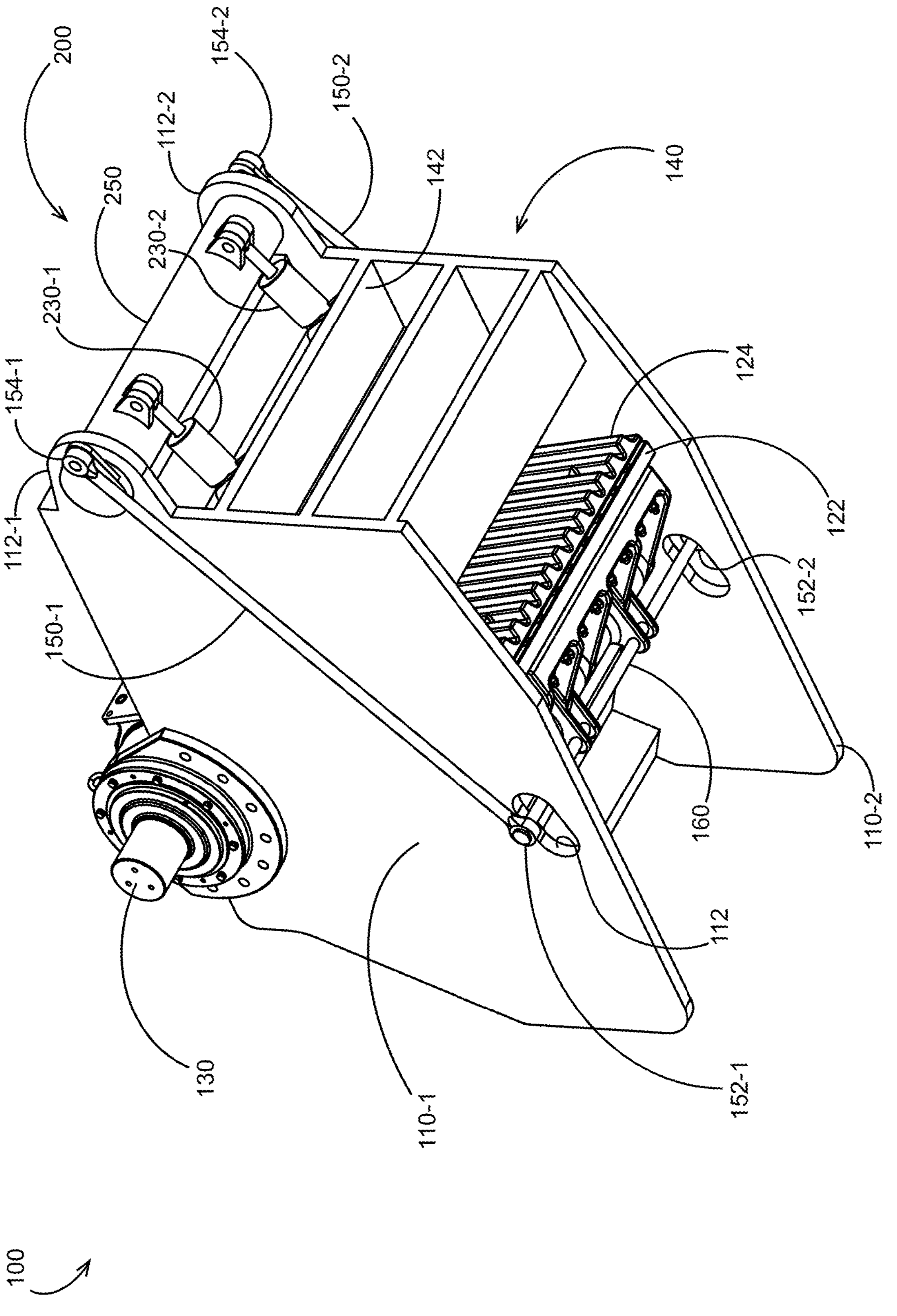
FIG. 2 is another perspective view of the jaw crusher of FIG. 1.
Figure 3:
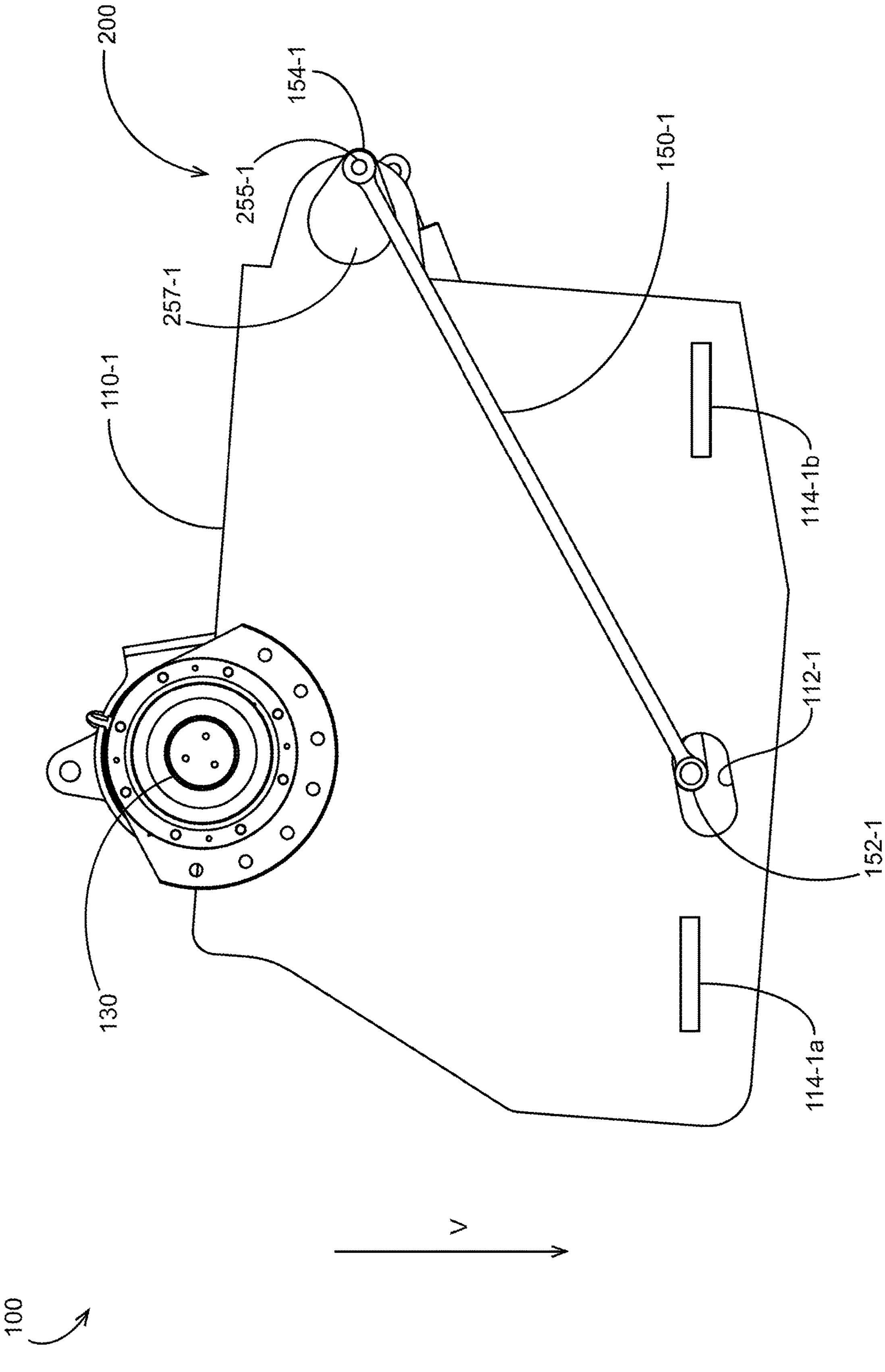
FIG. 3 is a side elevation view of the jaw crusher of FIG. 1.

In some embodiments, the position of the pivot points 154-1, 154-2 is optionally adjustable (e.g., so as to modify the minimum gap G and/or path $P_L$). Referring to FIGS. 2 and 3, in some embodiments the jaw crusher 100 comprises a pivot adjustment assembly 200. The pivot adjustment assembly 200 optionally comprises plates 257 each supporting an associated support 255. The plates 257-1, 257-2 are optionally supported on opposing sides of a shaft 250. The shaft 250 is optionally rotatably supported on the sidewalls 110-1, 110-2 (e.g., in openings, bearings, etc. provided in the sidewalls 110). In various embodiments, the shaft 250 is selectively rotatable in order to modify a location of the pivot points 154. In the illustrated embodiment, one or more actuators 230 (e.g., hydraulic cylinders, electric length-adjustable actuators, etc.) are supported on the jaw crusher (e.g., on a support plate 142 supported between sidewalls 110, etc.) at first ends thereof and pivotally coupled to the shaft 250 at second ends thereof. It should be appreciated that alternate extension and retraction of each actuator 230 rotates the shaft 250 and thus modifies the location of pivot points 154, thus modifying the minimum gap G (e.g., close-side setting of the jaw crusher).

Figure 4:
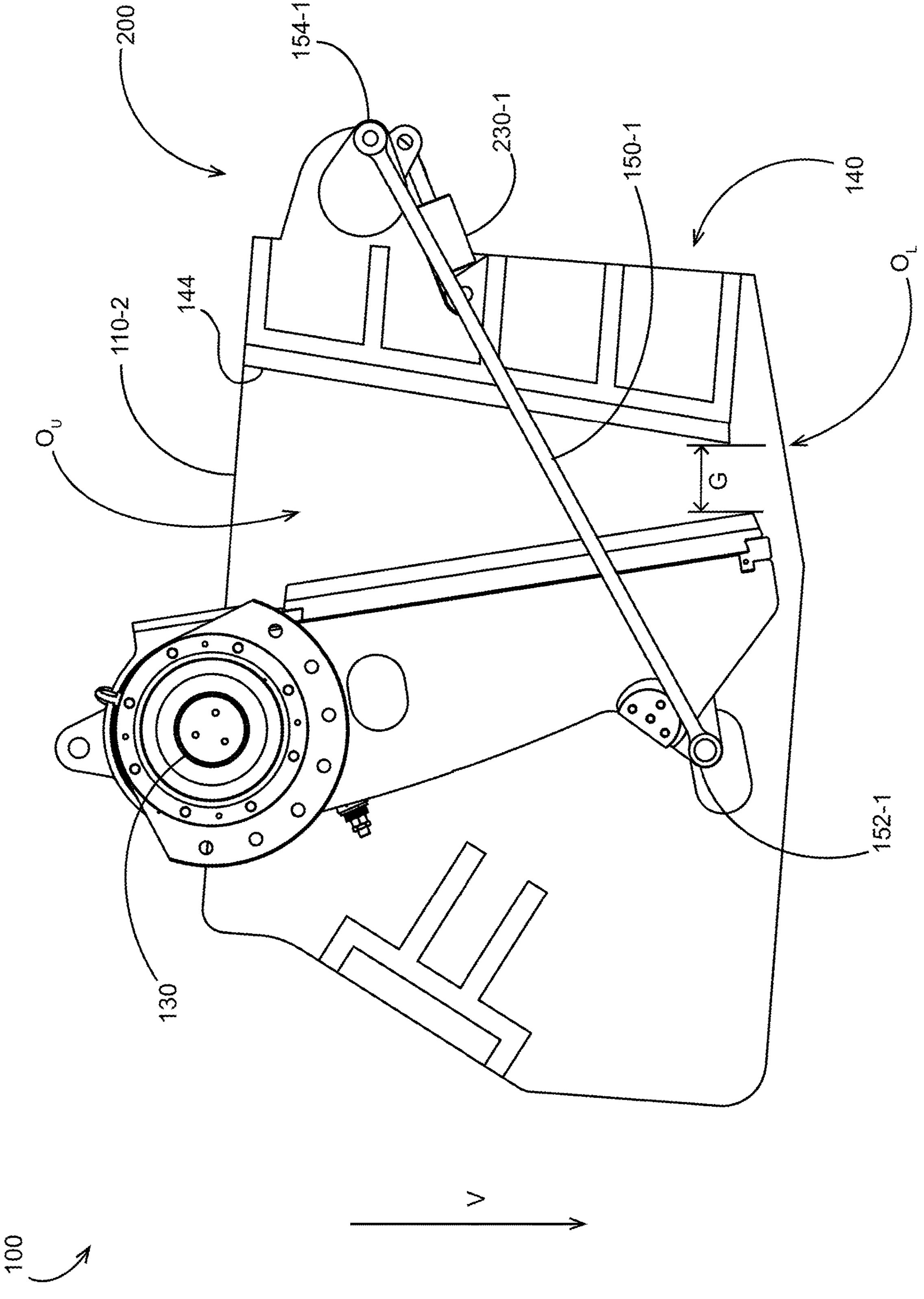
FIG. 4 is a side elevation view of the jaw crusher of FIG. 1 with a sidewall not shown.
Figure 6:
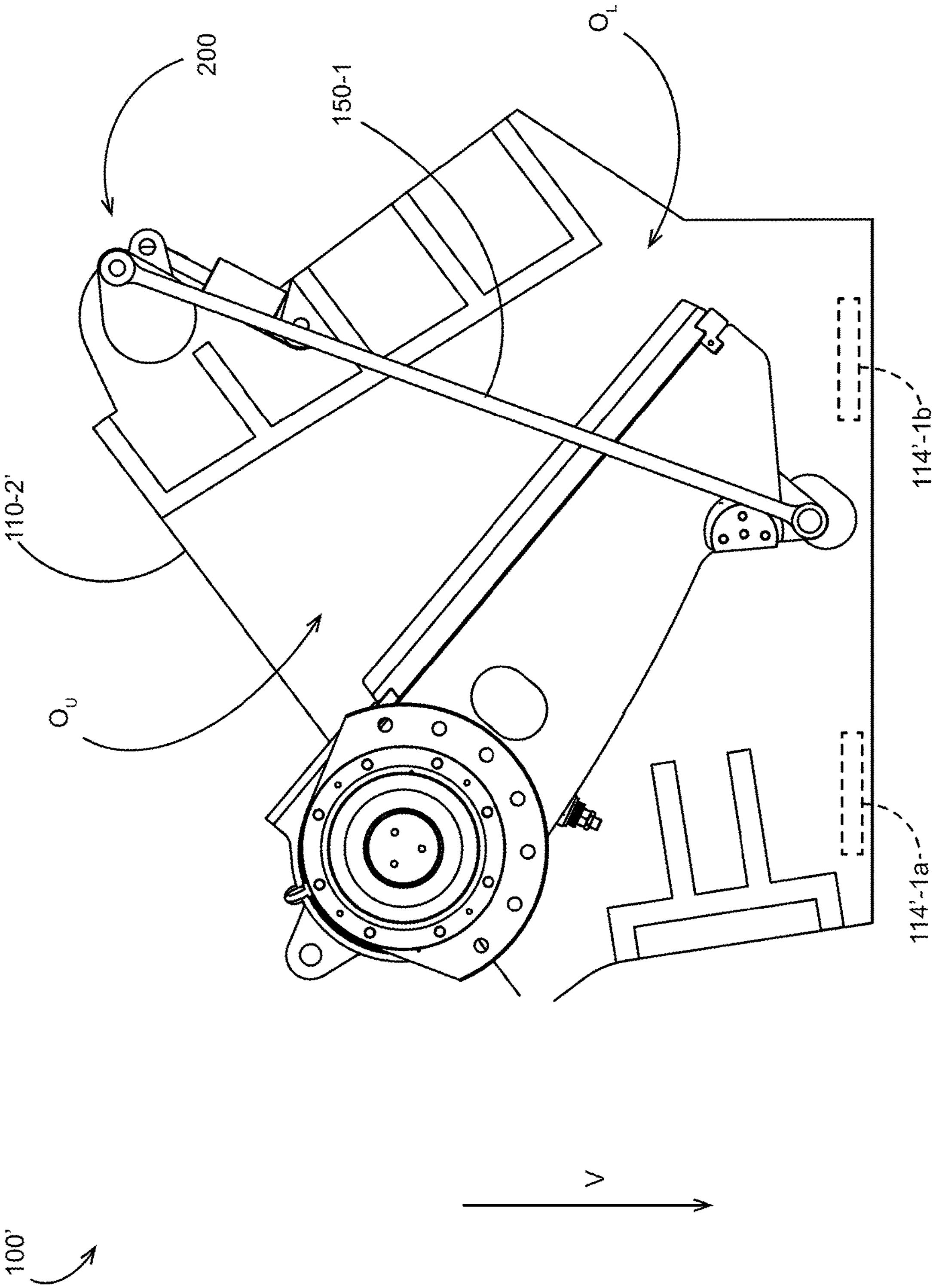
FIG. 6 is a side elevation view of another embodiment of a jaw crusher with a sidewall not shown.

Referring to FIGS. 3 and 4, in some embodiments the jaw crusher 100 is disposed (e.g., on footings 114 provided on sidewalls 110) such that the direction of travel of material through the crusher (and/or the orientation of the moveable and/or stationary jaw dies) is closer to vertical than horizontal (e.g., less than 45 degrees from vertical, less than 40 degrees from vertical, less than 30 degrees from vertical, less than 20 degrees from vertical, less than 15 degrees from vertical, less than 10 degrees from vertical, etc.). Referring to FIG. 6, in some embodiments the jaw crusher is disposed (e.g., on footings 114' provided on modified sidewalls 110') such that the direction of travel of material through the crusher (and/or the orientation of the moveable and/or stationary jaw dies) is at 45 degrees from horizontal or closer to horizontal than vertical (e.g., less than 45 degrees from horizontal, less than 40 degrees from horizontal, less than 30 degrees from horizontal, less than 20 degrees from horizontal, less than 15 degrees from horizontal, less than 10 degrees from horizontal, etc.).

Figure 7:
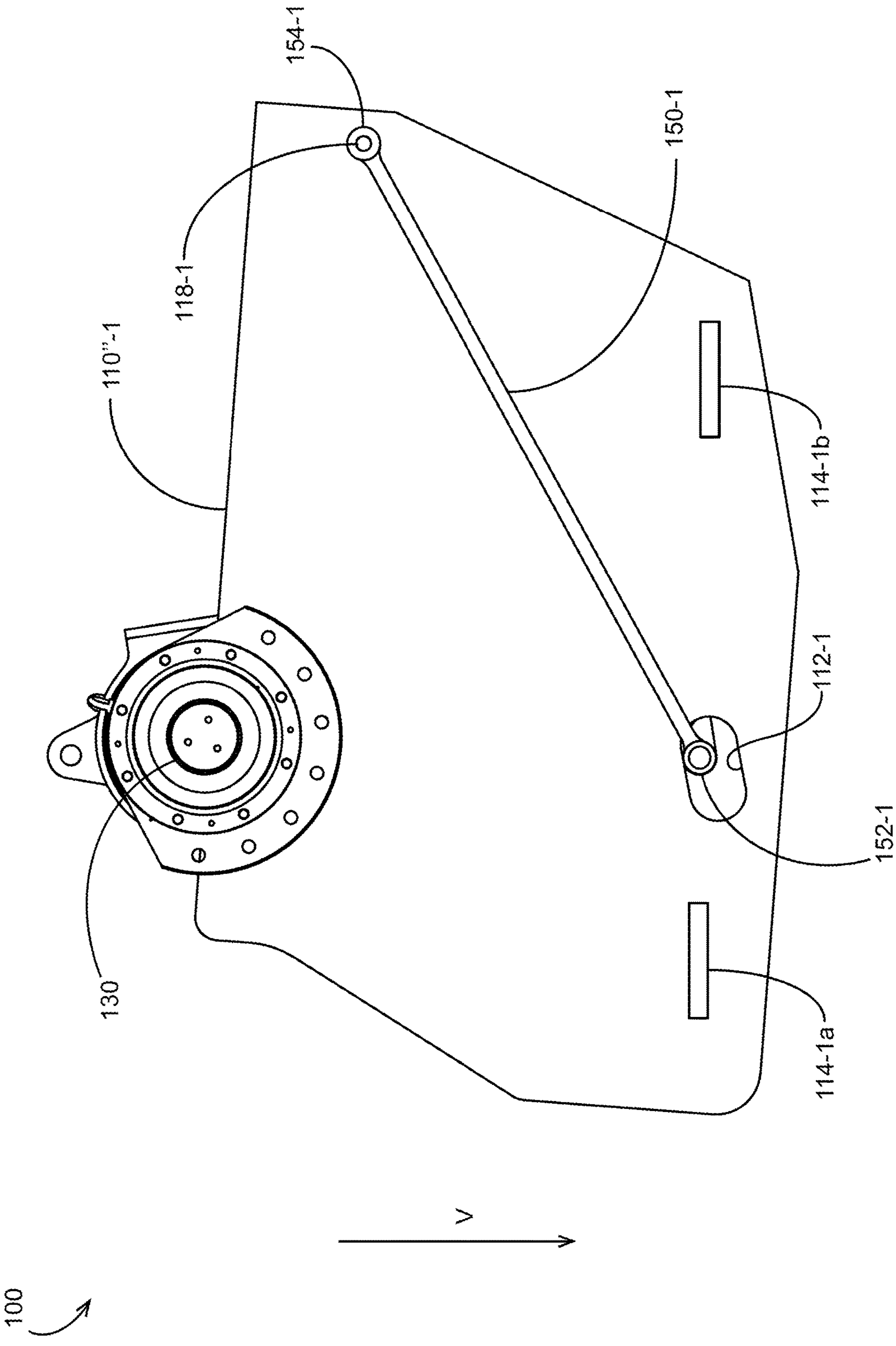
FIG. 7 is a side elevation view of another embodiment of a jaw crusher.
Figure 8:
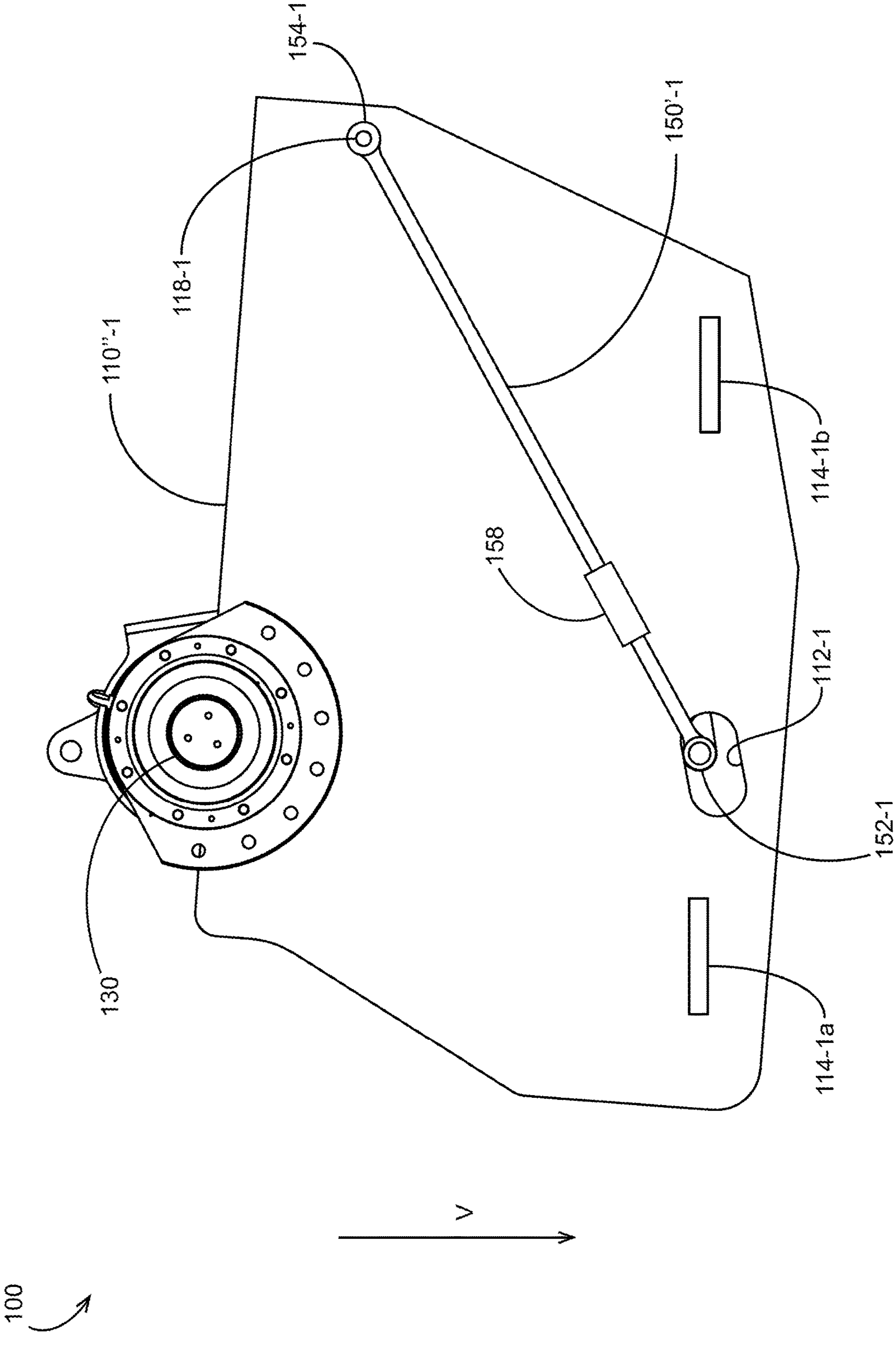
FIG. 8 is a side elevation view of another embodiment of a jaw crusher.

Referring to FIG. 7, in some embodiments the locations of pivot points 154 are not adjustable. In such embodiments an end of each link 150 is supported on a pin 118 supported by (e.g., supported on, mounted to, etc.) an associated sidewall 110" (e.g., an external surface of the sidewall). In some embodiments, pins 118-1, 118-2 supported by the sidewalls 110"-1, 110"-2 are coaxial; in some embodiments, the pins 118 are not coaxial. Referring to FIG. 8, in some embodiments (e.g., embodiments with non-adjustable pivot points 154) the lengths the links 150' are optionally adjustable. For example, each link 150' optionally comprises a turnbuckle 158 configured to alternately extend or retract the link 150 (e.g., by rotating the turnbuckle 158).

In some embodiments, the jaw crusher 100 has one or more features or functionalities in common with U.S. Pat. No. 6,641,068, incorporated herein by reference. In some embodiments, the jaw crusher 100 has one or more features or functionalities in common with U.S. Pat. No. 9,662,655, incorporated herein by reference. In some embodiments, the crushing faces (e.g., faces of the jaw dies) are optionally curved or arched across the width of the jaw crusher. Additionally or alternatively, in some embodiments the crushing faces have a variety of profiles such as flat, slotted, corrugated etc. Additionally or alternatively, in some embodiments the crushing faces are be tapered (or more narrow width) along the sides thereof, e.g., to allow passage of fines along the sides of the crushing faces.

In various embodiments, the crusher embodiments described herein may be self-standing and/or may be incorporated in a plant having other equipment thereon (e.g., vibratory screens, vibratory feeders, crushers, impactors, hoppers, conveyors, etc.). The crusher embodiments and/or plant embodiments including such impactor embodiments may be stationary or portable (e.g., supported on skids, tracks, or wheels) according to various embodiments.

Ranges recited herein are intended to inclusively recite all values and sub-ranges within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A jaw crusher, comprising:

first and second sidewalls;

an eccentric shaft rotatably supported on said first and second sidewalls;

an adjustment shaft rotatably supported on said first and second sidewalls;

a stationary jaw supported between said first and second sidewalls;

a moveable jaw supported on said eccentric shaft; and at least a first link connected to said moveable jaw and a second link connected to said moveable jaw, said first link and said second link defining a minimum gap between said stationary jaw and said moveable jaw, said first link and said second link being in tension as material is crushed between said stationary jaw and said moveable jaw, wherein said first link is coupled to said moveable jaw via a first pivot point, said second link is coupled to said moveable jaw via a second pivot point; and said adjustment shaft is configured between the first pivot point and the second pivot point to operably couple said first link to said second link, and wherein a position of each of said first pivot point and said second pivot point is adjustable.

2. The jaw crusher of claim 1, wherein said second link is disposed on an opposing side of said jaw crusher from said first link.

3. The jaw crusher of claim 1, further comprising at least a first actuator operably coupled to said first pivot point and said moveable jaw, wherein extension of said actuator modifies the position of said pivot point.

4. The jaw crusher of claim 1, wherein said stationary jaw comprises a crushing face, said crushing face extending along a first direction, wherein said first direction is closer to horizontal than vertical.

5. The jaw crusher of claim 1, wherein said link has a breaking strength selected to allow release of the moveable jaw upon introduction of uncrushable material.

6. The jaw crusher of claim 1, wherein said first link is adjustable in length.

* * * * *